Patented Sept. 29, 1931

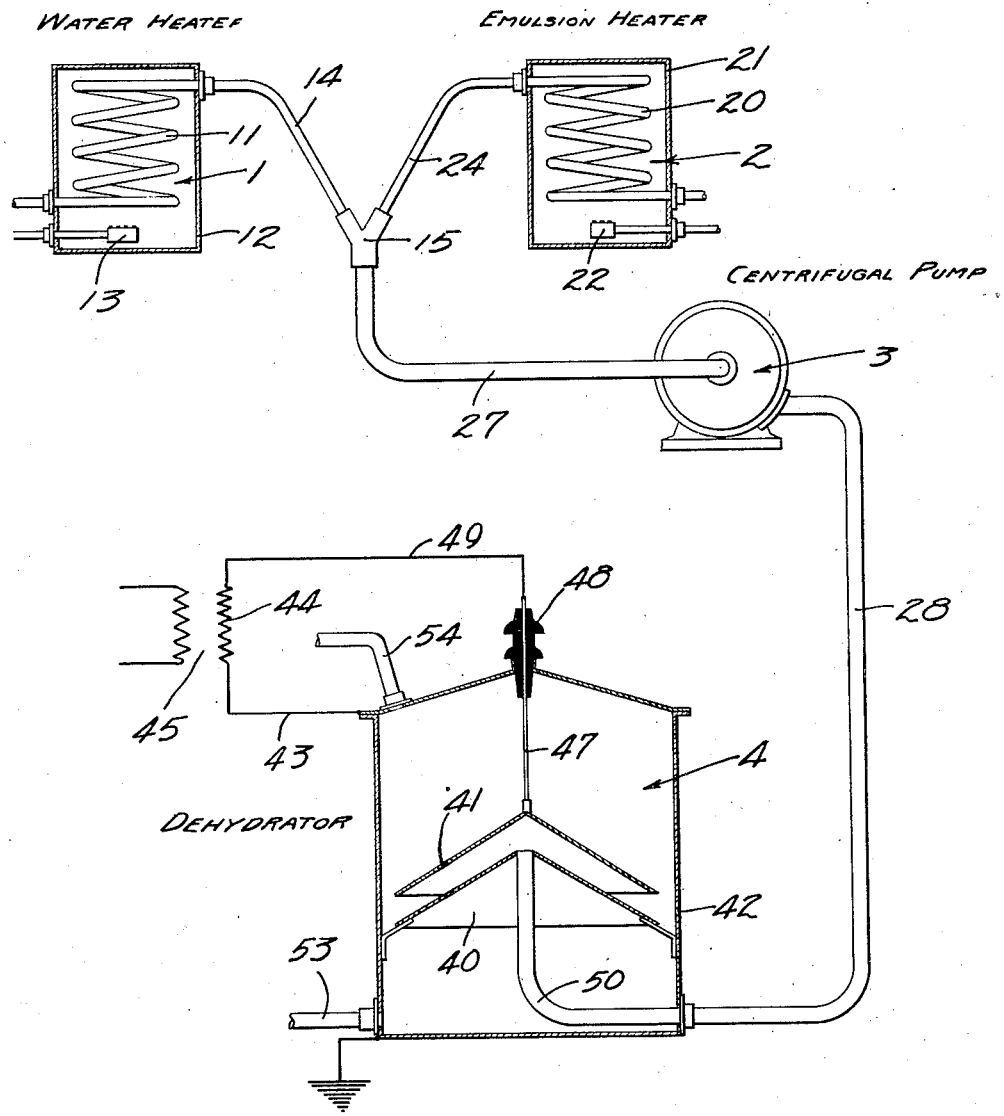

1,825,309

UNITED STATES PATENT OFFICE

HAROLD C. EDDY, OF LOS ANGELES, CALIFORNIA, ASSIGNOR TO PETROLEUM RECTIFYING COMPANY OF CALIFORNIA, OF LOS ANGELES, CALIFORNIA, A CORPORATION OF CALIFORNIA

METHOD OF REMOVING A SALT FROM OIL

Application filed October 3, 1927. Serial No. 223,602.

My invention relates to a method of removing a salt or other foreign substances from an oil or an emulsion.

The method is applicable to any oil which contains a foreign substance in a solid state or in the form of an emulsion.

The broad object of my invention is to provide a method of removing a foreign substance from an oil or an emulsion.

One field in which this method finds utility is in the petroleum industry and my invention will be described with particular reference to one problem met with in that field—that of removing salt from an oil emulsion. I do not in any way wish to limit myself in this particular application of my method, nor to the petroleum industry, the following description being for illustrative purposes only.

Petroleum often becomes associated with water and forms an emulsion. Before the petroleum is of commercial value the water content must be removed therefrom. This is ordinarily accomplished by means of an electrical treater in which the emulsion is subjected to the action of an electric field, coalescing the water particles into masses of sufficient size to gravitate from the petroleum.

Very often the water of the emulsion carries a comparatively large weight of salt in solution. This solution may be so strong, in fact, that crystalline particles of salt are present in the emulsion. It has been found almost impossible to remove this salt by the methods in use at present.

It is an object of my invention to provide a method of treating oils, either dry or emulsified, which carry an excessive quantity of salt.

Other objects and advantages of the invention will be made evident hereinafter.

The method of this invention as used in the petroleum industry for treating emulsified oils may be best understood by reference to the drawings in which I have diagrammatically shown an apparatus whereby the process may be performed. Referring to the drawings: 1 is a water-heater, 2 is an emulsion-heater, 3 is a mixer in the form of a centrifugal-pump, and 4 is a dehydrator.

The water-heater 1 has a coil 11 which is enclosed by a housing 12 and which is heated by means of a burner 13. Connected to the coil 11 is a water supply-pipe 14 which connects to a Y fitting 15. The emulsion-heater 2 has a coil 20 which is enclosed in a housing 21 and heated by a burner 22. Connected to the coil 20 is a pipe 24 which is also connected to the Y fitting 15. Extending from the Y fitting 15 to the centrifugal-pump 3 is a pipe 27, and extending from the centrifugal-pump 3 to the dehydrator 4 is a pipe 28. The dehydrator 4 may be of any suitable design having a grounded electrode 40 and a live electrode 41 which are situated in a tank 42. The grounded electrode 40 is connected by means of a conductor 43 to a secondary 44 of a transformer 45. The live electrode 41, which is supported on a rod 47 which extends through an insulator 48, is connected to the other side of the secondary 44 by means of a conductor 49. The pipe 28 is connected to a supply-pipe 50 which introduces emulsion into the space between the electrodes 40 and 41. Water is withdrawn from the lower part of the tank 42 by means of a pipe 53, and dry oil is removed from the upper part of the tank 42 by means of an oil-pipe 54.

The method of this application of the invention is carried on as follows:

The water which passes through the water-heater 1 is employed as an absorbing-medium. It should be understood that water is used only because in this embodiment of the invention it is most desirable. I do not wish to be limited to water as an absorbing-medium, however, but intend that any suitable absorbing-medium may be used. Water is heated and passes through the pipe 14 and the Y fitting 15. The emulsion is delivered to the heater 2 where the temperature thereof is raised to a suitable degree. This emulsion in this embodiment of the invention may be termed a primary emulsion and is a mixture of petroleum and water, the water having salt in solution and the oil salt in suspension to such an extent that it cannot be successfully treated according to ordinary methods. The emulsion having been heated, passes through the pipe 24 to the Y fitting 15 where it is brought into contact with the water or absorbing-medium. The two liquids pass through the pipe 27 to the centrifugal-pump 3. The centrifugal-pump 3 is a very good emulsifier and brings the fresh water into intimate contact with the petroleum and the salt water of the primary emulsion as well as with the crystalline salt suspended in the oil or water of the primary emulsion. The action which takes place at this time is the formation from the primary emulsion of a secondary artificial emulsion in which the crystalline salt is absorbed entirely in the water phase and the concentration of the salt solution forming the dispersed phase of the emulsion is greatly reduced. It should be understood that the centrifugal-pump is used only typically as an emulsifying mechanism and any other suitable type of emulsifier may be used. The secondary emulsion passes through the pipe 28 and into a treating space between the electrodes 40 and 41, an electric field being established at this time by the transformer 45. The concentration of the salt in solution and suspension is so reduced in the secondary emulsion that it may be successfully treated and the salts removed with the water. The water particles of the emulsion which are not already large enough to gravitate to the bottom of the tank 42 are coalesced by electrical treatment into particles having sufficient mass to precipitate from the petroleum. The water particles pass to the bottom of the tank 42 and are withdrawn through a pipe 43. The petroleum from which the water has been separated passes upward to the upper part of the tank 42 and is withdrawn through the oil-pipe 54.

In the method of this invention it is possible to take petroleum which has heretofore been very costly to treat and remove the salt from the petroleum in an economical manner. It is not always essential to heat the water or absorbing-medium nor to heat the oil or emulsion. This is done, however, in some cases because of the fact that the fresh water can associate with the water phase of an emulsion much easier when the emulsion is hot because the viscosity of the oil is greatly reduced. In addition to this, hot water has greater salt-absorbing qualities than cold water.

It should be understood that the dehydrator 4 is only one form of treater which is particularly effective in this application of the invention. Any other type of treater may be used without departing from the spirit of my invention.

I claim as my invention:

1. A method of removing foreign solid particles from an oil, which includes the steps of: dissolving the solid particles with a solvent to form a solution; and thereafter separating said solution from said oil by subjecting them to the action of an electric field.

2. A method of removing crystalline particles of salt from an oil, which includes the steps of: mixing said oil with a solvent capable of dissolving said crystalline particles of salt to form an emulsion; and subjecting said emulsion to the action of an electric field to separate said oil from the remaining constituents of said emulsion.

3. A method of removing crystalline salt from an oil and water emulsion, which method includes the steps of: dissolving said crystalline salt by adding a solvent to said emulsion; and thereafter separating the dissolved salt from the remainder of the emulsion.

4. A method of removing crystalline salt from an emulsion of oil and water, which method includes the steps of: adding to said emulsion a solvent capable of dissolving said crystalline salt and in sufficient quantities to dissolve said crystalline salt; mixing said emulsion and said solvent to form a secondary emulsion; subjecting said secondary emulsion to the action of a high intensity electric field; and separating the dissolved salt and the water from said oil.

5. A method of removing crystalline particles of salt from an emulsion of oil and water, which method includes the steps of: adding hot water to said emulsion in sufficient quantities to dissolve substantially all of said salt particles; subsequently mixing said hot water and said emulsion to form a secondary emulsion; subjecting said secondary emulsion to the action of an electric field; and separating the oil from the other constituents of said secondary emulsion.

In testimony whereof, I have hereunto set my hand at Los Angeles, California, this 27th day of September, 1927.

HAROLD C. EDDY.